US011130443B1

(12) United States Patent
Matsu et al.

(10) Patent No.: US 11,130,443 B1
(45) Date of Patent: Sep. 28, 2021

(54) LIGHT BAR ASSEMBLIES FOR A STEERING WHEEL

(71) Applicant: Autoliv ASP, Inc., Ogden, UT (US)

(72) Inventors: Richard L. Matsu, Plymouth, MI (US); Brian Tebelman Shellabarger, Detroit, MI (US); Julien Tudor, Shelby Township, MI (US); Werner Eckardt, Rochester, MI (US); Stephen Camm, Port Huron, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/116,980

(22) Filed: Dec. 9, 2020

(51) Int. Cl.
| | |
|---|---|
| *B60Q 3/20* | (2017.01) |
| *B62D 1/04* | (2006.01) |
| *B60Q 3/62* | (2017.01) |
| *B60Q 3/70* | (2017.01) |
| *F21V 23/00* | (2015.01) |
| *F21V 8/00* | (2006.01) |
| *F21V 3/00* | (2015.01) |
| *F21W 106/00* | (2018.01) |
| *F21Y 115/10* | (2016.01) |

(52) U.S. Cl.
CPC ............ *B60Q 3/20* (2017.02); *B60Q 3/62* (2017.02); *B60Q 3/70* (2017.02); *B62D 1/046* (2013.01); *F21V 3/00* (2013.01); *F21V 23/005* (2013.01); *G02B 6/005* (2013.01); *F21W 2106/00* (2018.01); *F21Y 2115/10* (2016.08)

(58) Field of Classification Search
CPC . B60Q 3/20; B60Q 3/283; B60Q 3/62; B60Q 3/70; B62D 1/00–286; F21V 3/00; F21V 23/005; F21V 29/70; F21Y 2115/10; G02B 6/0035; G02B 6/0045; G02B 6/005

USPC ................................................ 362/37–60
See application file for complete search history.

(56) References Cited

U.S. PATENT DOCUMENTS

| | | | |
|---|---|---|---|
| 8,841,929 | B2 | 9/2014 | Bennett et al. |
| 8,918,252 | B2 | 12/2014 | Frojdh et al. |
| 9,233,638 | B2 | 1/2016 | Lisseman et al. |
| 9,248,851 | B2 | 2/2016 | Vantzelfde et al. |
| 9,308,856 | B2 | 4/2016 | Lisseman et al. |
| 9,308,857 | B2 | 4/2016 | Lisseman et al. |
| 9,533,687 | B2 | 1/2017 | Lisseman et al. |
| 9,815,406 | B2 | 11/2017 | Lisseman et al. |
| 9,821,703 | B2 | 11/2017 | Lisseman et al. |
| 9,873,446 | B2 | 1/2018 | Gardner et al. |
| 10,036,843 | B2 | 7/2018 | Lisseman |
| 10,046,786 | B2 | 8/2018 | Lisseman et al. |

(Continued)

FOREIGN PATENT DOCUMENTS

| | | |
|---|---|---|
| CN | 208101827 | 11/2018 |
| CN | 111169525 | 5/2020 |

(Continued)

OTHER PUBLICATIONS

US 9,776,551 B2, 10/2017, Lisseman et al. (withdrawn)

*Primary Examiner* — Jason M Han
(74) *Attorney, Agent, or Firm* — Stoel Rives LLP (57) ABSTRACT

Light bar assemblies configured to be mounted to a rim of a steering wheel of a vehicle are disclosed. The light bar assemblies can include components of a driver monitoring system. The light bar assembly includes two shells defining or surrounding the rim and a wrapping surrounding the two shells. A portion of the wrapping is tucked into a slot disposed between the two shells forming a slit. A lens is disposed within the slit and pinched by the wrapping to prevent leakage of light around the lens.

18 Claims, 6 Drawing Sheets

(56) References Cited

U.S. PATENT DOCUMENTS

| | | |
|---|---|---|
| 10,059,250 B2 | 8/2018 | Lisseman et al. |
| 10,179,541 B2 | 1/2019 | Lisseman et al. |
| 2012/0283914 A1 | 11/2012 | Karwaczynski |
| 2014/0109719 A1 | 4/2014 | Lisseman et al. |
| 2014/0111324 A1 | 4/2014 | Lisseman et al. |
| 2014/0111325 A1 | 4/2014 | Lisseman et al. |
| 2014/0224040 A1 | 8/2014 | Vantzelfde et al. |
| 2016/0025281 A1 | 1/2016 | Gardner et al. |
| 2016/0185354 A1 | 6/2016 | Lisseman et al. |
| 2016/0188987 A1 | 6/2016 | Lisseman et al. |
| 2016/0191859 A1 | 6/2016 | Lisseman |
| 2016/0311366 A1 | 10/2016 | Lisseman |
| 2018/0208111 A1 | 7/2018 | Lisseman et al. |
| 2018/0237050 A1 | 8/2018 | Gardner et al. |
| 2019/0275935 A1 | 9/2019 | Lisseman et al. |
| 2020/0001782 A1 | 1/2020 | Kamei et al. |

FOREIGN PATENT DOCUMENTS

| | | |
|---|---|---|
| DE | 102011112134 | 3/2013 |
| DE | 102016123786 | 6/2017 |
| DE | 102016123793 | 6/2017 |
| DE | 102017218402 | 4/2019 |
| DE | 102018200591 | 7/2019 |
| JP | 2010241275 | 10/2010 |
| JP | 2010241276 | 10/2010 |
| JP | 2017109520 | 6/2017 |
| WO | 2010113551 | 10/2010 |
| WO | 2017116898 | 7/2017 |
| WO | 2018129189 | 7/2018 |

LIGHT BAR ASSEMBLIES FOR A STEERING WHEEL

TECHNICAL FIELD

The present disclosure relates generally to the field of steering wheels. More specifically, the present disclosure relates to a light bar assembly of a steering wheel and in some embodiments a steering wheel mounted driver monitoring system (DMS).

BACKGROUND

A steering wheel of a vehicle is a prominent component of a vehicle. A steering wheel is disposed forward of a driver (or operator occupant) of the vehicle for easy and clear access by the driver. Steering wheels historically have been rather simple and clean with a single purpose of allowing the driver to direct a vehicle, though more recently there has been proliferation of buttons and switches on steering wheels for providing driver inputs to the vehicle systems. Even more recently, the steering wheel has been identified as a close and prominent feature for monitoring and/or communicating with a driver. For example, illumination features and haptic features can provide information and/or feedback from the vehicle to the driver. A steering wheel may also be well positioned for mounting of sensors and monitoring devices to monitor a driver.

A steering wheel mounted driver monitoring system (DMS) may monitor a driver when a vehicle is in motion. The DMS may monitor the driver for signs of distraction, drowsiness, etc. that may lead to a vehicular accident causing harm or death to the occupants of the vehicle. The DMS may detect a direction of the driver's head and/or eyes as signs of distraction and drowsiness. Additionally, the DMS may detect eye blink frequency as a sign of distraction and drowsiness. The DMS may also monitor the driver when an autonomous or a semi-autonomous control system of the vehicle is engaged. The DMS may provide visual, audible, and/or physical alerts, warnings, or automatically disengage the semi-autonomous control system if driver distraction or drowsiness is detected. Some steering wheel mounted DMS suffer from one or more drawbacks or may perform less than optimally in one or more respects. Certain embodiments disclosed herein can address one or more of these issues.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

A steering wheel of a vehicle is a prominent component of a vehicle disposed forward of a driver of the vehicle for ease of access to operate the vehicle, and more specifically to control direction of the vehicle. Steering wheels have typically been simple with a single purpose of providing the driver a means to direct a vehicle, though more recently buttons and switches have begun to appear on steering wheels for providing driver inputs to the vehicle (e.g., to the sound system or audio visual system, cruise control, bluetooth connected phone or other device, and vehicle dashboard display). Even more recently, the steering wheel has been identified and utilized as a close and prominent feature for providing signals to or otherwise communicating with the driver and for monitoring a driver. For example, illumination features and haptic features have been incorporated to provide information and/or feedback from the vehicle to the driver. A steering wheel may also be well positioned for mounting of sensors and monitoring devices to monitor a driver.

Driver monitoring systems (DMS) are used to reduce or minimize vehicular accidents due to drowsy or distracted driving. DMS have been mounted at various locations within a vehicle, including, but not limited to, the steering wheel, the dashboard and/or instrument panel, or in an overhead position. In the following disclosure, "DMS" generally refers to a driver monitoring system that is typically mounted to the steering wheel, although the principles discussed may apply to other types of driver monitoring systems installed at other locations within a vehicle. A DMS can include a light bar assembly. Alternatively or in addition, a light bar assembly can include components of a DMS.

As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

The disclosed light bar assemblies are typically mounted to a portion of a rim of a steering wheel using a housing having two mating shells. A wrapping or covering covers an exterior surface of the shells. A lens is disposed within a slit between the two portions of the wrapping such that the lens abuts the wrapping to prevent leakage of light between the lens and the wrapping. The light bar assembly may facilitate illumination of a driver's face with infrared (IR) light from IR light emitting diodes (LEDs) such that a camera can detect the driver's face and eyes. The light bar assembly can also transmit visible light from visible LEDs to provide an indication of a status of an associate DMS.

In other embodiments, a light bar assembly may be incorporated into a rim of a steering wheel to provide feedback and/or communicate information to a driver of a vehicle. The light bar assembly may emit light colors and/or patters to display or communicate status and/or other information about the vehicle and/or the environment surrounding the vehicle.

FIGS. 1-5B illustrate different views of light bar assemblies and related components according to various embodiments of the present disclosure. In certain views each device may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

Figure 1:
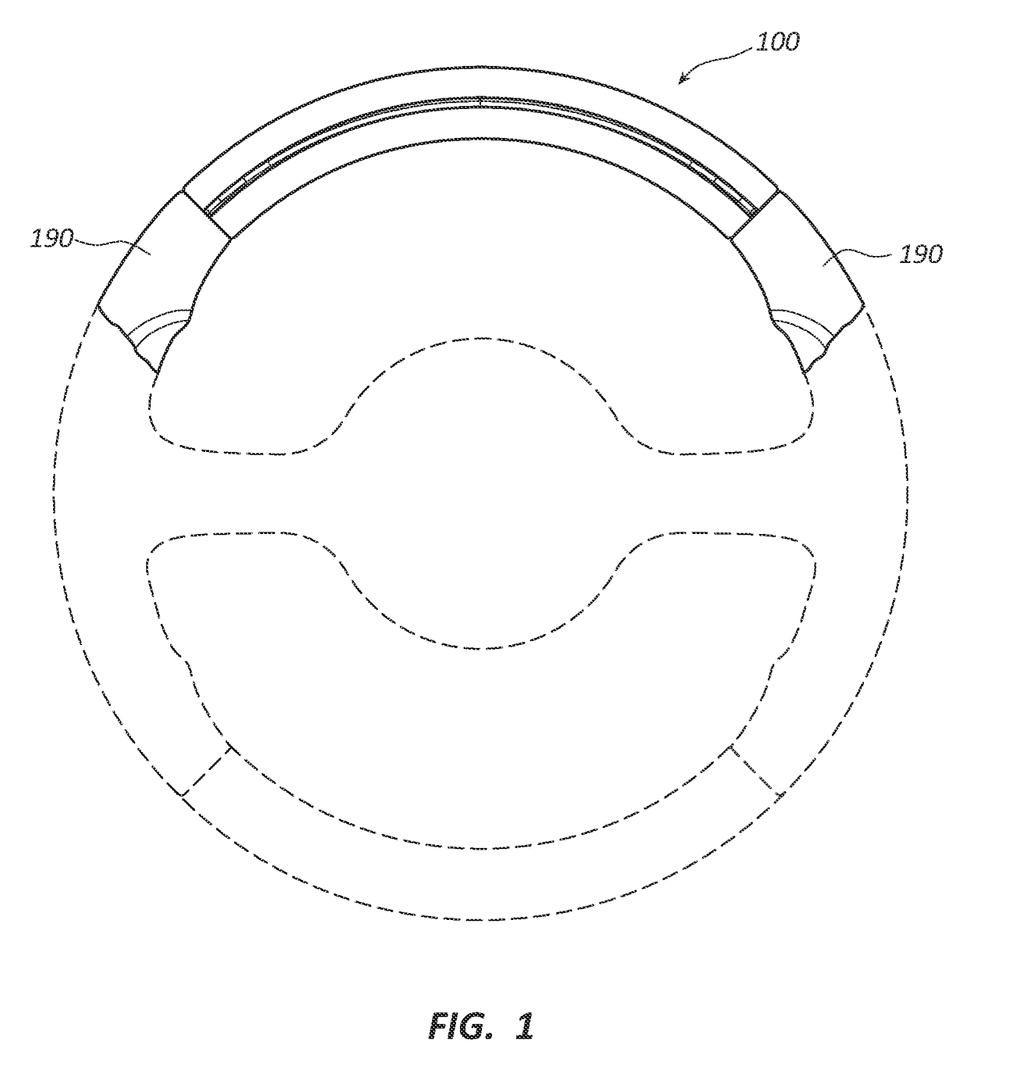
FIG. 1 is a front view of a light bar assembly mounted to a steering wheel, according to one embodiment of the present disclosure.
Figure 2:
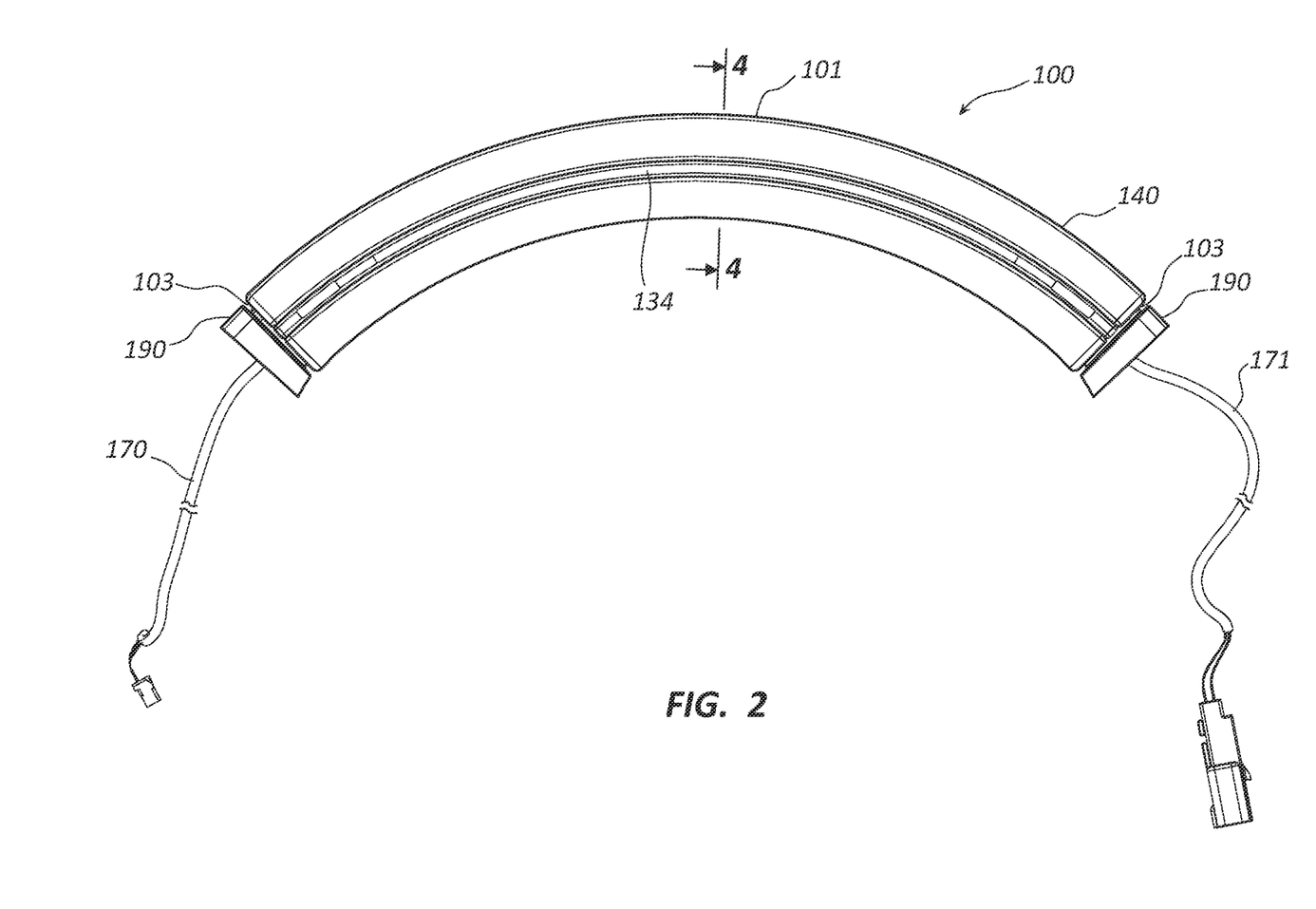
FIG. 2 is a front view of the light bar assembly of FIG. 1.
Figure 3:
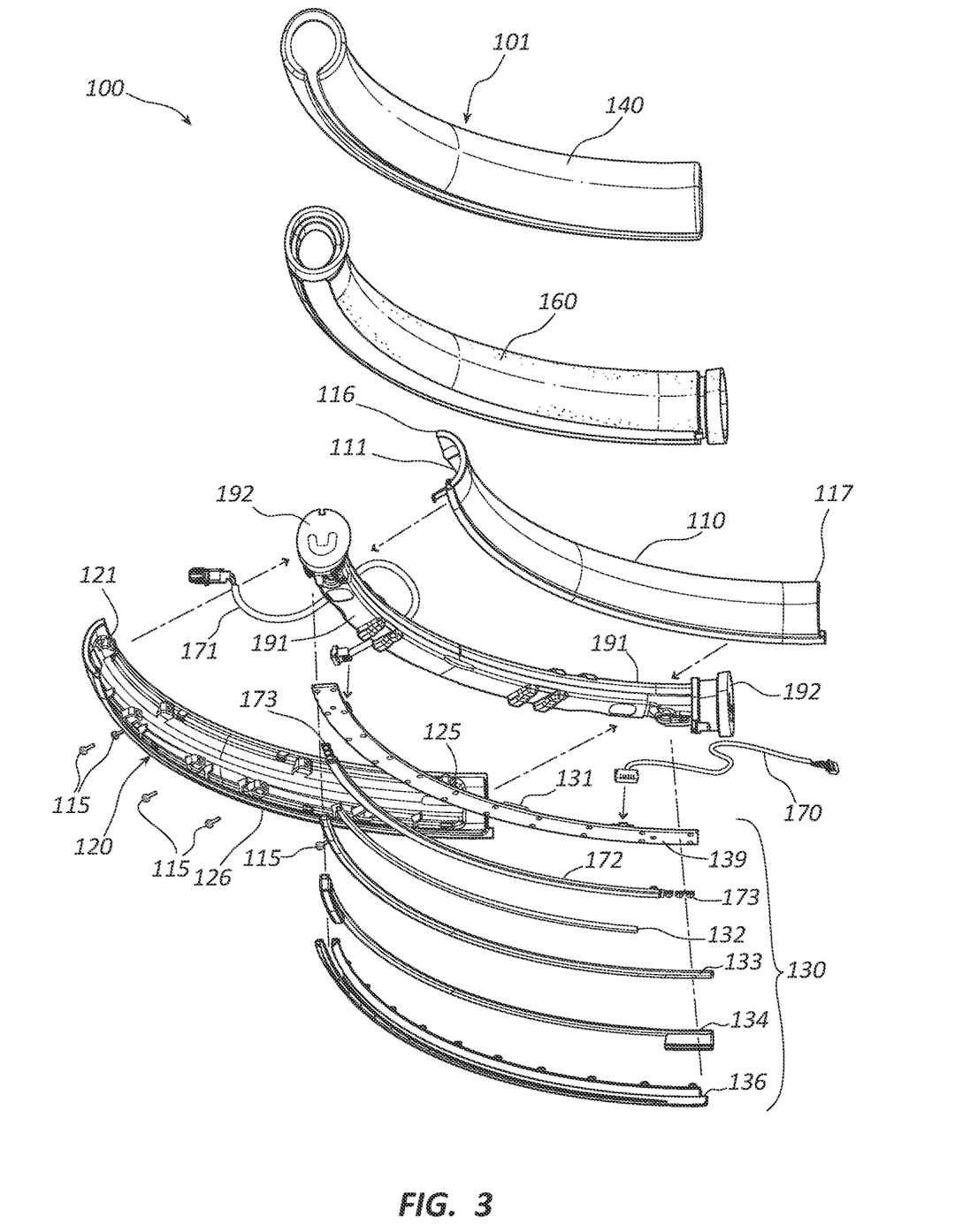
FIG. 3 is an exploded view of certain components of the light bar assembly of FIG. 1.
Figure 4:
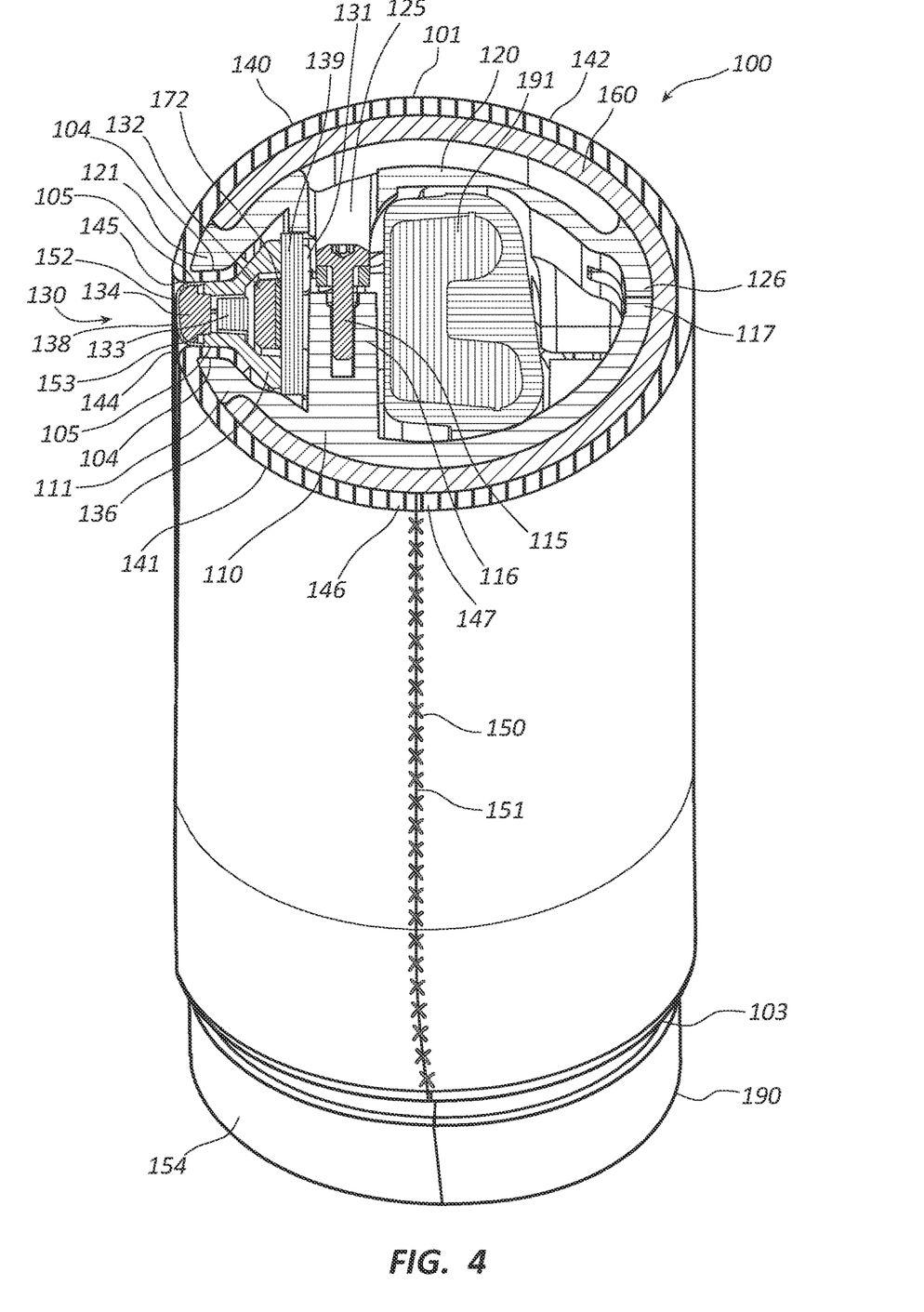
FIG. 4 is a cross-sectional view of the light bar assembly of FIG. 1.

FIGS. 1-4 depict a light bar assembly 100 according to one embodiment of the present disclosure. FIG. 1 is a front view of a light bar assembly 100 mounted to a steering wheel 190, according to one embodiment of the present disclosure. FIG. 2 is a front view of the light bar assembly 100 of FIG. 1. FIG. 3 is an exploded view of certain components of the light bar assembly 100 of FIG. 1. FIG. 4 is a cross-sectional view of the light bar assembly 100 of FIG. 1.

In the illustrated embodiment of FIG. 1, the light bar assembly 100 is coupled to a steering wheel 190 such that the light bar assembly 100 partially forms a portion of the steering wheel 190. The light bar assembly 100 is mounted to an upper portion of the steering wheel 190. In other embodiments, the light bar assembly 100 may be disposed at any suitable location on the steering wheel 190. For example, the light bar assembly 100 can be positioned on either side portion 193 or bottom portion 194 of the steering wheel 190. In another embodiment, the light bar assembly 100 may define an entire circumference of the steering wheel 190.

As depicted in FIG. 2, the light bar assembly 100 can include a body 101, a wrapping or covering 140, a lens, 134, a visible LED harness 170, and an IR LED harness 171. The body 101 is shown in FIG. 2 to have an elongate arcuate shape and to extend between tuck grooves 103. The arcuate shape may include an arc length of about 20 mm to about 300 mm. In some embodiments, the body 101 may have any suitable elongate shape, such as straight, angled, etc. to accommodate a steering wheel having a D-shape, rectangular shape, yokes, etc. As shown in FIG. 2, the lens 134 includes an elongate arcuate shape similar to the elongate arcuate shape of the body 101. The lens 134 is disposed within the light bar assembly 100 such that it is directed toward the driver of the vehicle.

The wrapping 140 is depicted in FIG. 2 to cover the body 101 between the side portions 193 of the steering wheel 190 except where the lens 134 is disposed within the light bar assembly 100. In some embodiments, the wrapping is adhered or coupled to an exterior surface of the inner and outer shell members 110, 120. The wrapping 140 can be tucked into the tuck grooves 103 adjacent each end of the body 101. The tuck grooves 103 may hide ends of the wrapping 140 to create an aesthetically pleasing appearance and to prevent the ends from catching on a vehicle driver's hand as the steering wheel 190 is turned. The wrapping 140 can include a single elongate strip, two elongate strips, three elongate strips, or more elongate strips as will be discussed below. The wrapping 140 of the embodiment illustrated in FIG. 2 may include a leather material. In other embodiments, the wrapping 140 can be formed of any suitable, non-visible light transmissive material, such as natural leather, vinyl, synthetic leather, microfiber synthetic leather, polysuede, etc.

As shown in FIG. 2, the visible LED harness 170 and the IR LED harness 171 are shown to extend from ends of the body 101. Within the body 101, the visible and infrared (IR) LED harnesses 170, 171 are coupled to a PCB assembly 130 (shown in FIG. 3). Exterior to the body 101, the visible and IR LED harnesses 170, 171 are passed into the steering wheel 190 and coupled to controllers which are configured to control activation of visible LEDs 172 and IR LEDs 173 (shown in FIG. 3) coupled to the PCB assembly 130.

FIG. 3 is an exploded view of certain components of the light bar assembly 100 and depicts that the inner shell 110 may be disposed at an inner circumference of the body 101 and the outer shell 120 may be disposed at an outer circumference of the body 101. When assembled, the inner and outer shells 110, 120 can surround a portion of a rim 191 of an armature 192 of the steering wheel 190 and can be mounted to the rim 191. In some embodiments, the light bar assembly 100 is configured to couple at each end of the light bar assembly 100 to the armature 192 of the steering wheel 190 to complete a gap in the rim 191 of the steering wheel 190. The inner and outer shells 110, 120 may be coupled together using any suitable technique. For example, the inner and outer shells 110, 120 can be coupled using fasteners, heat welding, ultrasonic welding, vibration welding, heat staking, bonding, etc. In the illustrated embodiment of FIG. 3, the inner and outer shells 110, 120 may be coupled or affixed by fasteners 115 (e.g., screws). The inner and outer shells, 110, 120 may be formed of any suitable material, such as polycarbonate (PC), acrylonitrile butadiene styrene (ABS), polyamide, polyethylene terephthalate, aluminum, magnesium, PC/ABS, polybutylene terephthalate, etc.

The inner shell 110 can include an elongate arcuate shape and a semi-circular transverse cross-sectional shape. The inner shell 110 may include a slot edge 111 and an abutting edge 117 disposed opposite of the slot edge 111. The outer shell 120 can include an elongate arcuate shape and a semi-circular transverse cross-sectional shape as shown in FIG. 4. The outer shell 120 may include a slot edge 121 and an abutting edge 126 disposed opposite of slot edge 121. When assembled, as depicted in FIG. 4, the slot edge 111 of the inner shell 110 may be configured to align with the slot edge 121 of the outer shell 120 and may define a slot 104 disposed between the slot edges 111, 121. The slot 104 can be disposed on a vehicle-rearward facing surface of the light bar assembly 100. A width of the slot 104 may range from about 2 mm to about one half of a circumference (of the transverse cross-section) of the body 101. Additionally, when assembled, the abutting edges 117, 126 can be disposed such that they abut or contact each other.

In the illustrated embodiment of FIGS. 3 and 4, the PCB assembly 130 may be disposed, at least partially, within the assembled inner and outer shells 110, 120 and may extend along a length of the inner and outer shells 110, 120. The PCB assembly 130 can include a PCB bar 139, a LED driver 131 mounted to the PCB bar 139 and configured to drive the visible LEDs 172 and/or the IR LEDs 173 mounted to the PCB bar 139, a light guide 132, a diffuser or intermediate lens 133, a lens 134, and a housing 136. In other words, the LEDs are not disposed within the slot 104. The LED driver 131 can be any suitable automotive grade, multichannel LED driver. For example, the LED driver 131 may be a Texas Instrument TPS929120 12 channel 40-V high-side LED driver or any other suitable LED driver. The visible LEDs 172 may be of any suitable type. For example, the visible LEDs 172 may include RGB chips configured to emit red light (625 nm), green light (528 nm), and blue light (465 nm). The RGB chips can be tuned such that the visible LEDs 172 emit one or more of a plurality of colors through color mixing of the red, green and blue colors. The number of visible LEDs 172 can range from two to 16 or more.

The IR LEDs 173 can be configured to emit IR light within a near IR spectrum having a wavelength ranging from about 800 nm to about 2500 nm and may be about 940 nm. Other suitable wavelengths may be utilized. The number of IR LEDs 173 may range from two to six or more. The IR LEDs 173 may be disposed at opposing ends of the PCB bar 139 such that they are spaced approximately 20 mm to 300 mm apart.

The light guide 132 can have an arcuate, elongate shape as shown in FIG. 3 and a rectangular transverse cross-sectional shape as shown in FIG. 4. The light guide 132 can be disposed adjacent the visible LEDs 172 to direct the visible and IR light emitted by the visible and IR LEDs 172, 173 toward the diffuser 133. The light guide 132 may be formed from any suitable transparent or translucent material. For example, the light guide 132 can be formed from poly(methyl methacrylate) (PMMA), polycarbonate, glass, etc. An Index of Refraction of the light guide 132 may range from about 1.4 to about 1.6 and may be about 1.492.

The diffuser 133 can be disposed between the light guide 132 and the lens 134. The diffuser can have an arcuate, elongate shape as illustrated in FIG. 3 and a square transverse cross-sectional shape as illustrated in FIG. 4. The light diffuser 133 may be configured to evenly distribute or diffuse the visible and/or IR light received from the light guide 132 through the diffuser 133 prior to transmittance of the light to the lens 134. The diffuser 133 can be formed of any suitable clear material, such as PMMA, polycarbonate, polyamide, etc. The diffuser 133 may be textured on its top and/or bottom surfaces to facilitate an even diffusion of the light over a length of the diffuser 133. The texture can be of any suitable grade that promotes an even diffusion of light. In other embodiments, the top surface of the diffuser 133 may be configured as a Fresnel lens having curved and tilted faces.

The lens 134 may be disposed adjacent the diffuser 133 and may include an arcuate elongate shape as depicted in FIG. 3. The lens 134 can be configured to receive diffused light from the diffuser 133 and transmit the light toward the driver of the vehicle such that the visible light may be noticeable by the driver and the IR light may illuminate the driver's face. The lens 134 may be formed of PMMA, polycarbonate, or any other suitable material. An Index of Refraction of the lens 134 can range from about 1.4 to about 1.6. A transverse cross-sectional profile of the lens 134, as shown in FIG. 4, may include a mushroom shape with a head portion 138 having a width larger than a width of a stem portion 153. The width of the head portion 138 may range from about 2 mm to about one half of the circumference (of the transverse cross-section) of the body 101. In other embodiments, the lens 134 may be of any suitable shape, such as dome, polygonal, etc. The head portion 138 can be covered with a film 152 to provide a scratch and chemical resistant surface for the lens 134. In certain embodiments, the film 152 is formed of a polycarbonate base with an ultraviolet curable hard coat. In other embodiments, the film 152 can include a spray or dip hard coating. A bottom surface of the lens 134 may be textured in a similar manner to textured surfaces of the diffuser 133.

A lens housing 136 may be coupled to the PCB bar 139. The lens housing 136 can be formed of any suitable material that is IR light transmissive and visible light non-transmissive. FIG. 4 illustrates that the stem portion 153 of the lens 134 can be disposed within the lens housing 136 such that it retains the stem portion 153 and the head portion 138 extends beyond the lens housing 136. The diffuser 133, light guide 132, visible LEDs, 172, and IR LEDs 173 may be disposed within the lens housing 136.

FIGS. 3 and 4 illustrate an embodiment of the light bar assembly 100 including a pad or cushion 160 disposed between the wrapping 140 and the inner and outer shells 110, 120. As depicted in the embodiment of FIGS. 3 and 4, the pad 160 can surround the inner and outer shells 110, 120. In another embodiment, the pad 160 may cover the outer shell 120. The pad 160 may be formed of polymer foam, such as polyurethane foam or a natural material, such as cotton. In certain embodiments, the pad 160 can be a heat mat, a hands-on-detection (HOD) mat, or a combination of the heat mat and the HOD mat can be disposed between the wrapping 140 and the inner and outer shells 110, 120. In other embodiments, a hands-off-detector can be disposed between the wrapping 140 and the inner and outer shells 110, 120. In some embodiments, the light bar assembly 100 does not include the pad 160.

FIG. 4 is a transverse cross-section of the light bar assembly 100. In the embodiment of FIG. 4, the light bar assembly 100 is disposed around the rim 191. The inner shell 110 and the outer shell 120 are coupled together such that they surround the rim 191. The inner shell 110 and the outer shell 120 can be coupled together using any suitable technique, such as fastening, heat welding, ultrasonic welding, vibration welding, heat staking, bonding, etc. For example, the depicted embodiment of FIG. 4 shows the inner shell 110 and the outer shell 120 coupled together using a fastener 115 (e.g. a screw). A head of the screw 115 is disposed in a screw receiver 125 of the outer shell 120 and the threads of the screw 115 are threaded into a threaded receiver 116 of the inner shell 110.

In the embodiment of FIG. 4, a first elongate strip 141 of the wrapping 140 includes a first edge portion 144. The first edge portion 144 is wrapped around the slot edge 111 and disposed or tucked into the slot 104. A second elongate strip 142 includes a second edge portion 145 that is wrapped around the slot edge 121 and disposed or tucked into the slot 104. The first and second edge portions 144, 145 define a slit 105 disposed between the first and second edge portions 144, 145. A width of the slit 105 may range from about 0.5 mm to about one half of the circumference of the body 101. A thickness of the first and second edge portions 144, 145 can range from about 0.7 mm to about 1.5 mm. In certain embodiments, the second elongate strip 142 can be an integral portion of a wrapping 154 used to wrap the steering wheel 190 outside of the light bar assembly 100. In other embodiments, the first and second elongate strips 141, 142 can be separate strips that are coupled (e.g., stitched) to each other and to the wrapping 154.

As illustrated in FIG. 4, at least a portion of the lens 134 is disposed within the slit 105 and directed vehicle-rearward toward a driver of the vehicle. The first and second edge portions 144, 145 can pinch or abut opposing sides of the head portion 138 of the lens 134 to prevent visible light transmitted by the visible LEDs 172 from leaking around the lens 134 while allowing passage of the visible light through the lens 134. In other words, the first and second edge portions 144, 145 contact the sides of the head portion 138 of the lens 134 to create a light shield that prevents visible light from passing between the lens 134 and the first and second edge portions 144, 145. The pinching may occur when the inner and outer shells 110, 120 are coupled together, and thereby the slot edge 111 of the inner shell 110 and the slot edge 121 of the outer shell 120 provide sufficient force to pinch the first and second edge portions 144, 145 against opposing sides of the lens 134.

In some embodiments, the width of the slit 105 may be smaller than the width of the head portion 138 of the lens 134 such that the first and second edge portions 144, 145 may be compressed by the lens 134 and there is little or no space or gap between the lens 134 and the first and second edge portions 144, 145. In other words, a distance between the lens 134 and the abutting covering 140 is zero mm. In certain embodiments, the lens housing 136 is not visible within the slit 105 to the driver of the vehicle. In other embodiments, a small portion of the lens housing 136 on both sides of the lens 134 may be visible to the driver of the vehicle. For example, a visible portion of the lens housing 136 may have a width of about 1.1 mm on each side of the lens 134.

Figure 5A:
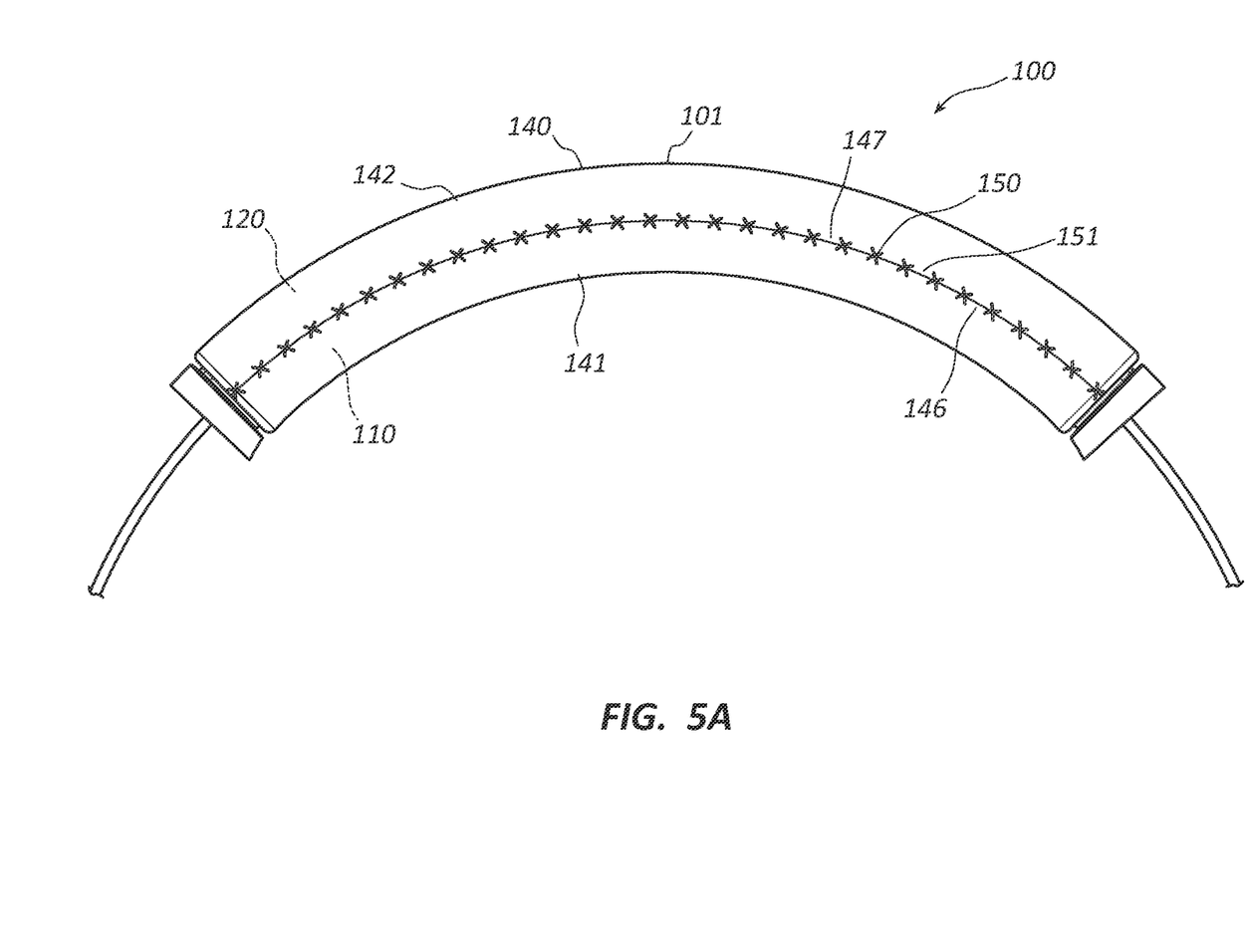
FIG. 5A is a back view of the light bar assembly of FIG. 1 showing stitching of a first wrapping strip and a second wrapping strip on a backside of the light bar assembly, according to one embodiment of the present disclosure.
Figure 5B:
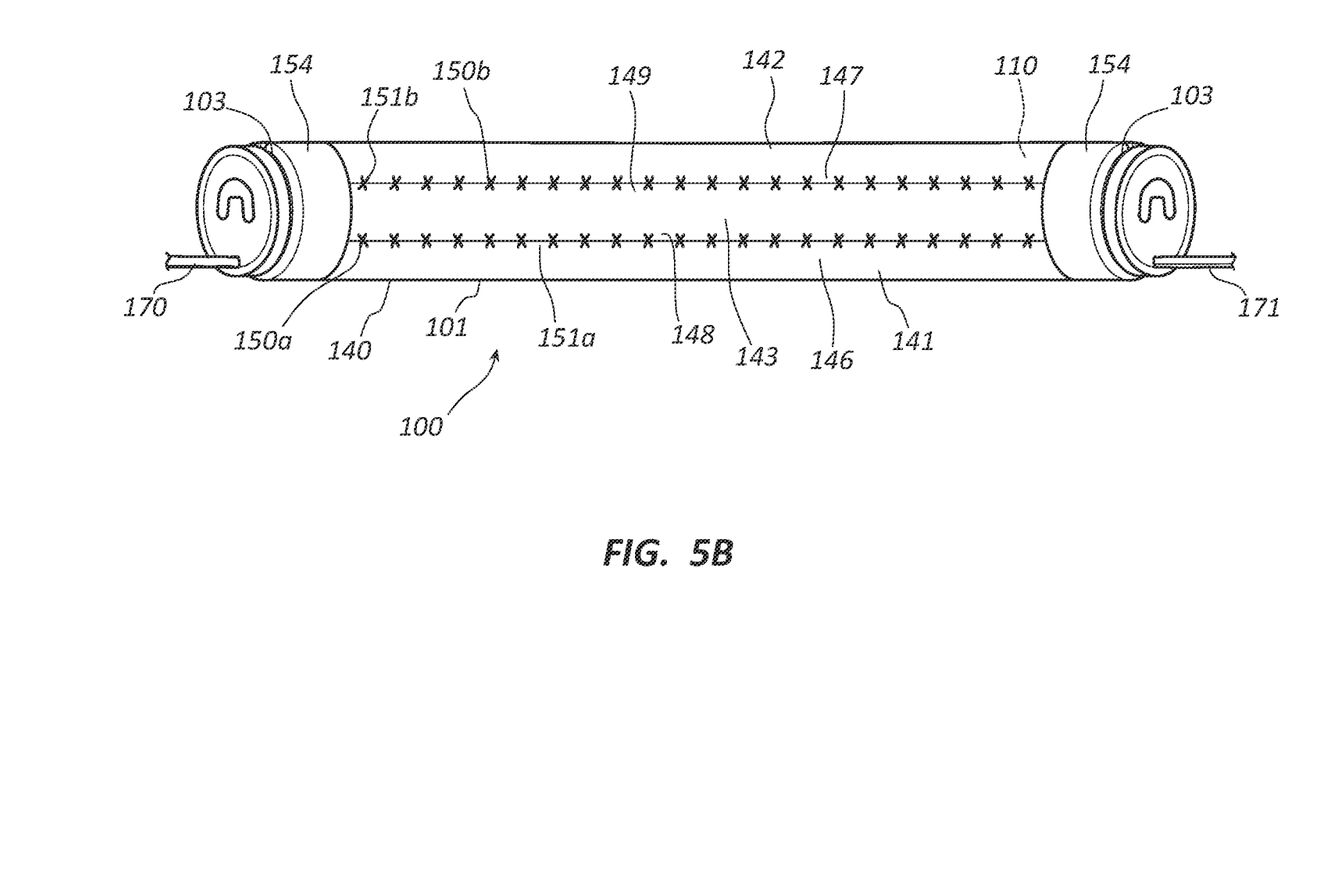
FIG. 5B is a bottom view of the light bar assembly of FIG. 1 showing stitching of a first wrapping strip, a second wrapping strip, and a third wrapping strip, according to one embodiment of the present disclosure.

FIGS. 5A and 5B show the wrapping 140 wrapped around the inner and outer shells 110, 120. FIG. 5A illustrates a backside of the light bar assembly 100 where the backside is opposite of the lens 134 (e.g., a vehicle forward side of the light bar assembly 100). As illustrated, the first strip 141 of the wrapping 140 includes a third edge 146 and the second strip 142 includes a fourth edge 147. The third edge 146 can abut or slightly overlap the fourth edge 147 to form a seam 151. The first strip 141 and the second strip 142 may wrap around or surround the inner and outer shells 110, 120. As illustrated, the third edge 146 and the fourth edge 147 are coupled together using a stitching 150. The stitching 150 can be formed of any suitable automotive grade cordage, such as nylon thread. In other embodiments, the third edge 146 and the fourth edge 147 may be coupled together using any suitable technique, such as heat sealing, bonding, gluing, etc. In other embodiments, the seam 151 can be disposed at any suitable location around a circumference of the light bar assembly 100. For example, the seam 151 can be disposed on a bottom portion, as illustrated in FIG. 4, of the light bar assembly 100.

FIG. 5B illustrates a bottom view of an embodiment of the light bar assembly 100 including a third strip 143 of the wrapping 140 disposed between the first strip 141 and the second strip 142. The third strip 143 includes a fifth edge 148 that can abut or overlap the third edge 146 to form a seam 151a. The fifth edge 148 and the third edge 146 can be coupled together using a stitching 150a. The third strip 143 includes a sixth edge 149 that can abut or overlap the fourth edge 147 to form a seam 151b. The sixth edge 149 and the fourth edge 147 can be coupled together using stitching 150b. A width of the third strip 143 may be any suitable width such that the seams 150a, 150b are disposed at any suitable location around the circumference of the light bar assembly. In the illustrated embodiment, the third strip 143 is disposed on an underside or back side of the light bar assembly 100.

Referring again to FIGS. 1-4, 5A, and 5B collectively, a method of assembling the light bar assembly 100 includes wrapping the first edge portion 144 of the first strip 141 around the slot edge 111 of the inner shell 110 and tucking the first edge portion 144 into the slot 104. The second edge portion 145 of the second elongate strip 142 is wrapped around the slot edge 121 of the outer shell 120 and tucked into the slot 104. The lens 134 is disposed in the slit 105. When the inner and outer shells 110, 120 are coupled together, the slot edge 111 of the inner shell 110 and the slot edge 121 of the outer shell 120 may provide sufficient force to pinch first and second edge portions 144, 145 of the covering 140 against opposing sides of the lens 134 such that the lens 134 is pinched by the first and second edge portions 144, 145. The diffuser 133, light guide 132, reflector 137, and PCB assembly 130 are disposed within the inner and outer shells 110, 120 such that they are adjacent the lens 134. In some embodiments, the LEDs are disposed within the inner and outer shells 120 such that the LEDs are not disposed within the slot 104 or slit 105.

The inner and outer shells 110, 120 are disposed around the rim 191 of the steering wheel and coupled together using the fastener 115. The wrapping 140 is wrapped around the inner and outer shells 110, 120 such that the third edge 146 of the first strip 141 abuts or overlaps the fourth edge 147 of the second strip 142. The third edge 146 and the fourth edge 147 are coupled together using the stitching 150. In some embodiments, if the wrapping is leather, the leather may be wet when wrapped around the inner and outer shells 110, 120 and stitched such that the leather shrinks as it dries, thus enabling the leather to conform to the shape of the body 101.

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

The phrases "attached to" or "attached directly to" refer to interaction between two or more entities which are in direct contact with each other and/or are separated from each other only by a fastener of any suitable variety (e.g., mounting hardware or an adhesive).

The terms "a" and "an" can be described as one, but not limited to one. For example, although the disclosure may recite a light bar assembly having "a lens," the disclosure also contemplates that the light bar assembly can have two or more lens.

Unless otherwise stated, all ranges include both endpoints and all numbers between the endpoints.

As used herein, the term "rearward" is used with reference to the back of the relevant vehicle. For example, a light bar assembly that transmits light in a rearward direction transmits the light toward the back of a vehicle.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention. Embodiments of the invention in which an exclusive property or privilege is claimed are defined as follows.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the term "about." For each such reference, it is to be understood that, in some embodiments, the value, feature, or characteristic may be specified without approximation.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the device to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A light bar assembly for a steering wheel, comprising:
   an inner shell member;
   an outer shell member, wherein the inner and outer shell members are coupled together;
   a covering disposed around a longitudinal edge of the inner shell member and a longitudinal edge of the outer shell member, wherein the longitudinal edge of the inner shell member and the longitudinal edge of the outer shell member define a slot; and
   a lens disposed within the slot,
   wherein the covering abuts the lens to prevent leakage of a light around the lens.

2. The light bar assembly of claim 1, wherein the covering is coupled to an exterior surface of the inner and outer shell members.

3. The light bar assembly of claim 1, wherein the covering includes any one or more of leather, vinyl, synthetic leather, microfiber synthetic leather, and polysuede.

4. The light bar assembly of claim 1, further comprising:
   a PCB assembly including a light guide driver;
   a light guide disposed within the inner and outer shell members; and
   a light diffuser.

5. The light bar assembly of claim 4, wherein the light guide comprises any one of visible LEDs, IR LEDs, and a combination thereof.

6. The light bar assembly of claim 5, wherein the light guide is disposed within a space defined by the inner shell member and the outer shell member a predetermined distance from the lens.

7. The light bar assembly of claim 5, wherein the light guide is disposed within a space defined by the inner shell member and the outer shell member a predetermined distance from the slot.

8. The light bar assembly of claim 1, wherein the light comprises any one of visible light, infrared light, and a combination thereof.

9. The light bar assembly of claim 1, wherein a width of a slit defined by opposing longitudinal edges of the covering abutting the lens ranges from about two mm to about six mm.

10. The light bar assembly of claim 9, wherein a width of the lens ranges from about two mm to six mm and corresponds to the slit.

11. The light bar assembly of claim 1, wherein a width of a slit defined by opposing longitudinal edges of the covering abutting the lens is about four mm.

12. The light bar assembly of claim 1, wherein a distance between the lens and the abutting covering is zero mm.

13. The light bar assembly of claim 1, wherein the steering wheel, comprises:
   an armature comprising a rim;
   wherein the light bar assembly is coupled to the armature; and
   wherein the first and second shell members surround a portion of the rim.

14. The light bar assembly of claim 1, wherein the lens is oriented toward a driver of a vehicle.

15. A method of preventing light leakage around a lens of a steering wheel, comprising:
   disposing an inner shell member and an outer shell member around a portion of a rim of a steering wheel armature;
   tucking a covering around a longitudinal edge of the inner shell member and a longitudinal edge of the outer shell member, wherein the longitudinal edge of the inner shell member and the longitudinal edge of the outer shell member define a slot;

pinching a lens within the slot between the covering, wherein the covering abuts the lens on opposing longitudinal edges of the lens to prevent light leakage around the lens.

16. The method of claim 15, further comprising coupling the inner shell member and the outer shell member together, wherein coupling the inner and outer shell members comprises any one of welding, heat-staking, screwing, bonding, and any combination thereof.

17. The method claim 16, wherein the coupling of the inner shell member and the outer shell member provides a force to pinch the lens on the opposing longitudinal edge of the lens with the covering.

18. The method of claim 15, further comprising coupling the covering to an exterior surface of the inner shell member and an exterior surface of the outer shell member, wherein coupling the covering comprises any one of gluing, bonding, stitching, and any combination thereof.

\* \* \* \* \*